(12) United States Patent
Shibata et al.

(10) Patent No.: US 7,353,618 B2
(45) Date of Patent: Apr. 8, 2008

(54) MAGNETIC SCALE

(75) Inventors: Masayuki Shibata, Tokyo (JP); Osamu Ochiai, Kanagawa (JP); Yuji Nagai, Kanagawa (JP); Hideo Maejima, Kanagawa (JP)

(73) Assignee: Sony Corporation (JP)

( * ) Notice: Subject to any disclaimer, the term of this patent is extended or adjusted under 35 U.S.C. 154(b) by 40 days.

(21) Appl. No.: 11/391,036

(22) Filed: Mar. 28, 2006

(65) Prior Publication Data
US 2006/0242854 A1 Nov. 2, 2006

(30) Foreign Application Priority Data
Mar. 29, 2005 (JP) ............................. 2005-093611

(51) Int. Cl.
*G01B 7/00* (2006.01)
(52) U.S. Cl. ..................................................... 33/708
(58) Field of Classification Search .................. 33/708, 33/706, DIG. 1; 324/207.24
See application file for complete search history.

(56) References Cited

U.S. PATENT DOCUMENTS 6,612,048 B2 *  9/2003  Peterlechner et al. ......... 33/706
6,670,806 B2 * 12/2003  Wendt et al. ........... 324/207.24
6,856,477 B2 *  2/2005  Morimoto ............... 324/207.34

FOREIGN PATENT DOCUMENTS

JP            62-226007 A      10/1987

* cited by examiner

*Primary Examiner*—Christopher W Fulton
(74) *Attorney, Agent, or Firm*—Lerner, David, Littenberg, Krumholz & Mentlik, LLP

(57) ABSTRACT

A magnetic scale includes a pipe and a polarizable magnetic member closely attached to the inner surface of the pipe so as to extend in the longitudinal direction of the pipe. The magnetic member is formed with magnetic marks provided by a plurality of N poles and S poles alternately arranged in the longitudinal direction of the magnetic member. Accordingly, the magnetic member can be reliably protected to thereby improve its durability.

9 Claims, 4 Drawing Sheets

MAGNETIC SCALE

CROSS-REFERENCE TO RELATED APPLICATIONS

The present application claims priority from Japanese Patent Application No. JP 2005-093611 filed on Mar. 29, 2005, the disclosure of which is hereby incorporated by reference herein.

BACKGROUND OF THE INVENTION

The present invention relates to a magnetic scale for use in position detection.

A position detecting device for detecting the position of a print head in a printer is proposed in Japanese Patent Laid-open No. Sho 62-226007, for example.

This position detecting device includes a magnetic scale and a magnetic sensor. The magnetic scale is provided with magnetic marks formed on the outer circumferential surface of a guide shaft for axially guiding the print head and arranged in the longitudinal direction of the guide shaft. The magnetic sensor is integrated with the print head and detects a change in magnetic field of the magnetic marks, thereby outputting a detection signal.

Then, the position of the print head in the longitudinal direction of the guide shaft is obtained according to the detection signal output from the magnetic sensor.

Such a position detecting device having a magnetic scale is widely applied to various machine tools, printers, automatic machines, etc. requiring position detection.

In the above-mentioned position detecting device, a magnetic member of the magnetic scale is exposed to the outside of the device. Accordingly, in the case that the position detecting device is mounted on a machine tool or the like, there is a possibility that an object may strike the magnetic member to damage it or a cutting fluid may adhere to the magnetic member to degrade it, causing a disadvantage in ensuring the durability of the magnetic scale.

It is accordingly desirable to provide a magnetic scale which can reliably protect a magnetic member included therein to improve its durability.

SUMMARY OF THE INVENTION

In accordance with the present invention, there is provided a magnetic scale including a pipe; and a polarizable magnetic member closely attached to the inner surface of the pipe so as to extend in the longitudinal direction of the pipe; the magnetic member being formed with magnetic marks provided by a plurality of N poles and S poles alternately arranged in the longitudinal direction of the magnetic member.

According to the present invention, the magnetic member including the magnetic marks is provided inside of the pipe. Accordingly, the magnetic member can be protected by the pipe, so that it is possible to prevent a problem such that an object may strike the magnetic member to damage it or a cutting fluid may adhere to the magnetic member to degrade it. Accordingly, the durability of the magnetic scale can be ensured.

Other objects and features of the invention will be more fully understood from the following detailed description and appended claims when taken with the accompanying drawings.

DETAILED DESCRIPTION

First Preferred Embodiment

A first preferred embodiment of the present invention will now be described with reference to the drawings.

Figure 1A:
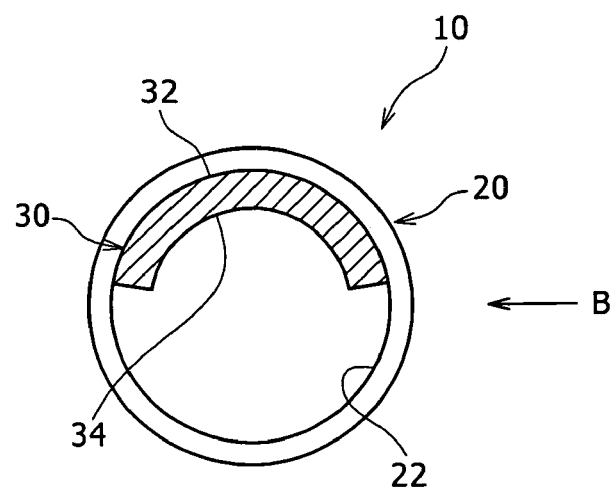
FIG. 1A is a sectional view of a magnetic scale according to a first preferred embodiment of the present invention.
Figure 1B:
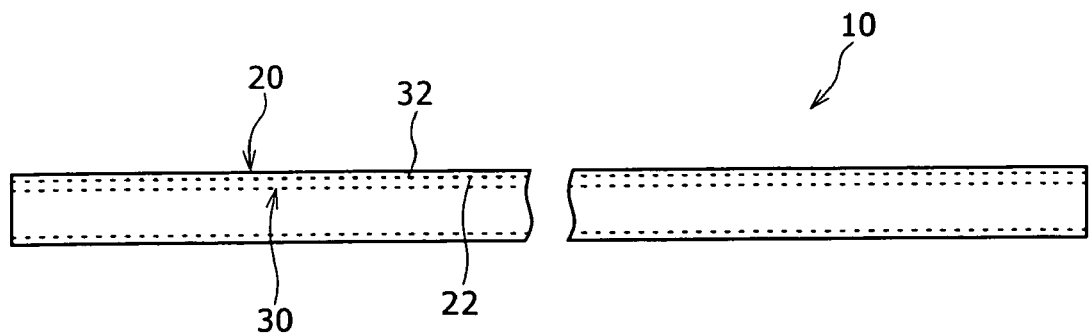
FIG. 1B is a view taken in the direction shown by an arrow B in FIG. 1A.

FIG. 1A is a sectional view of a magnetic scale 10 according to the first preferred embodiment, and FIG. 1B is a view taken in the direction shown by an arrow B in FIG. 1A.

Figure 2A:
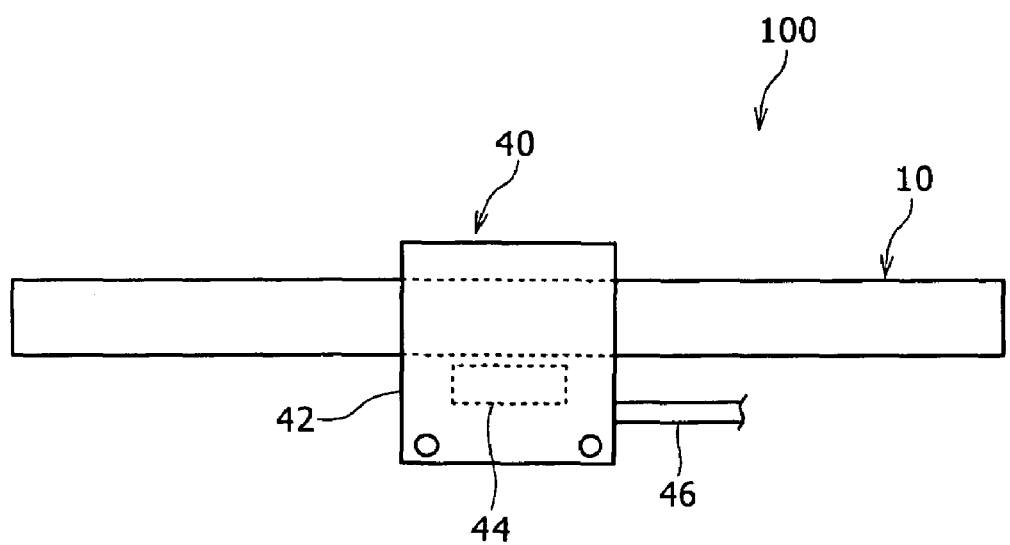
FIG. 2A is a schematic view of a detecting head combined type position detecting device using the magnetic scale shown in FIGS. 1A and 1B.

FIG. 2A is a schematic view of a position detecting device 100 using the magnetic scale 10 according to the first preferred embodiment.

As shown in FIG. 2A, the position detecting device 100 includes the magnetic scale 10 and a detecting head 40 supported to the magnetic scale 10 so as to be movable along the magnetic scale 10.

As shown in FIGS. 1A and 1B, the magnetic scale 10 includes a pipe 20 and a magnetic member 30.

The pipe 20 is a circular cylindrical member, and it is formed of a material having no magnetic effect on the magnetic force of the magnetic member 30.

More specifically, the pipe 20 is formed of a nonmagnetic material such as stainless steel 304 (JIS). Further, the material of the pipe 20 may have weak magnetism provided that it has no magnetic effect on the magnetic force of the magnetic member 30.

The magnetic member 30 is closely attached to the inner surface 22 of the pipe 20 and extends in the longitudinal direction of the pipe 20.

The magnetic member 30 is a strip member, and it has an outer surface 32 closely attached to the inner surface 22 of the pipe 20 and an inner surface 34 exposed to the inside space of the pipe 20.

More specifically, the magnetic member 30 is closely attached to a circumferential part of the inner surface 22 of the pipe 20 and extends straight in the longitudinal direction of the pipe 20.

The magnetic member 30 is a polarizable member, and it is formed with magnetic marks provided by a plurality of N poles and S poles alternately arranged with a given pitch in the longitudinal direction of the magnetic member 30. In other words, the magnetic member 30 is formed with magnetic marks including a periodic signal such that N poles and S poles alternately change in the longitudinal direction of the magnetic member 30. In still other words, a periodic magnetic pattern such that N poles and S poles alternately change in the longitudinal direction of the magnetic member 30 is recorded in the magnetic member 30.

The magnetic member 30 is formed of an elastic material such as rubber magnet.

The attachment of the magnetic member 30 to the inner surface 22 of the pipe 20 is effected by using a double-sided adhesive tape to bond the outer surface 32 of the magnetic member 30 and the inner surface 22 of the pipe 20. Thus, the outer surface 32 of the magnetic member 30 is closely attached through the double-sided adhesive tape to the inner surface 22 of the pipe 20.

The double-sided adhesive tape may be replaced by an adhesive.

The polarization of the magnetic member 30, that is, the formation of the magnetic marks is effected by using a dedicated polarizing device.

The polarizing device has a magnetic head and a drive circuit for supplying a drive current to the magnetic head to thereby generate a magnetic field from the magnetic head.

In the condition where the magnetic head of the polarizing device is exposed to the magnetic member 30, the magnetic head is relatively moved in the longitudinal direction of the magnetic member 30, and simultaneously the magnetic field from the magnetic head is applied to the magnetic member 30, thereby forming N poles and S poles alternately arranged with a given pitch in the longitudinal direction of the magnetic member 30, i.e., forming the magnetic marks.

The formation of the magnetic marks in the magnetic member 30 may be performed after attaching the magnetic member 30 to the inner surface 22 of the pipe 20. In this case, the magnetic head of the polarizing device is exposed to the outer surface of the pipe 20, and the magnetic field from the magnetic head is applied through the pipe 20 to the inner member 30. Alternatively, the formation of the magnetic marks in the magnetic member 30 may be performed before attaching the magnetic member 30 to the inner surface 22 of the pipe 20. In this case, the magnetic head of the polarizing device is directly exposed to the magnetic member 30 separated from the pipe 20.

In the case that the magnetic marks are formed after attaching the magnetic member 30 to the inner surface 22 of the pipe 20, an installation error of the magnetic member 30 to the inner surface 22 of the pipe 20 or an influence of deformation of the pipe 20 upon the pitch of N poles and S poles to be formed in the magnetic member 30 can be eliminated. Accordingly, as compared with the case that the magnetic field from the polarizing device is directly applied to the magnetic member 30 separated from the pipe 20 to form the magnetic marks, the accuracy of the magnetic marks can be ensured and a detection signal can therefore be obtained accurately by the detecting head 40 (see FIG. 2A).

As shown in FIG. 2A, the detecting head 40 includes a slide base 42 and a magnetic sensor 44.

The slide base 42 has a bearing through which the pipe 20 is inserted, so that the slide base 42 is slidably supported through the bearing to the pipe 20 in such a manner as to be slidable in the longitudinal direction of the pipe 20.

The magnetic sensor 44 is built in the slide base 42, and it is so positioned as to be opposed to the magnetic member 30 of the magnetic scale 10 with a given spacing defined therebetween.

The magnetic sensor 44 functions to detect a magnetic field and to output a detection signal according to the intensity of the magnetic field detected. For example, a magnetoresistive element (MR sensor) is used as the magnetic sensor 44. The magnetoresistive element functions so that an electrical resistance changes according to a change in applied magnetic field.

Accordingly, when the detecting head 40 is moved in the longitudinal direction of the pipe 20 to detect the magnetic marks formed in the magnetic member 30, a periodically changing (e.g., sinusoidally changing) detection signal can be obtained from the magnetic sensor 44.

Such a detection signal is supplied from the magnetic sensor 44 through a lead wire 46 to a detecting circuit known in the art, whereby a displacement of the detecting head 40 relative to the magnetic scale 10 is detected by the detecting circuit.

According to the magnetic scale 10 in this preferred embodiment, the magnetic member 30 including the magnetic marks is provided inside of the pipe 20. Accordingly, the magnetic member 30 can be protected by the pipe 20. More specifically, it is possible to prevent a problem such that an object may strike the magnetic member 30 to damage it or a cutting fluid may adhere to the magnetic member 30 to degrade it. Accordingly, the durability of the magnetic scale 10 can be ensured.

The magnetic scale 10 can be configured with such a simple structure that the magnetic member 30 is provided on the inner surface 22 of the pipe 20. Accordingly, it is unnecessary to provide any support member for supporting the magnetic member 30, thereby allowing a cost reduction and a size reduction.

In the case that the magnetic scale 10 is used in the position detecting device 100 as in this preferred embodiment, the pipe 20 can be used as a guide member for slidably supporting the detecting head 40. Accordingly, it is unnecessary to provide any guide member for guiding the detecting head 40, thereby allowing a cost reduction and a size reduction.

Figure 2B:
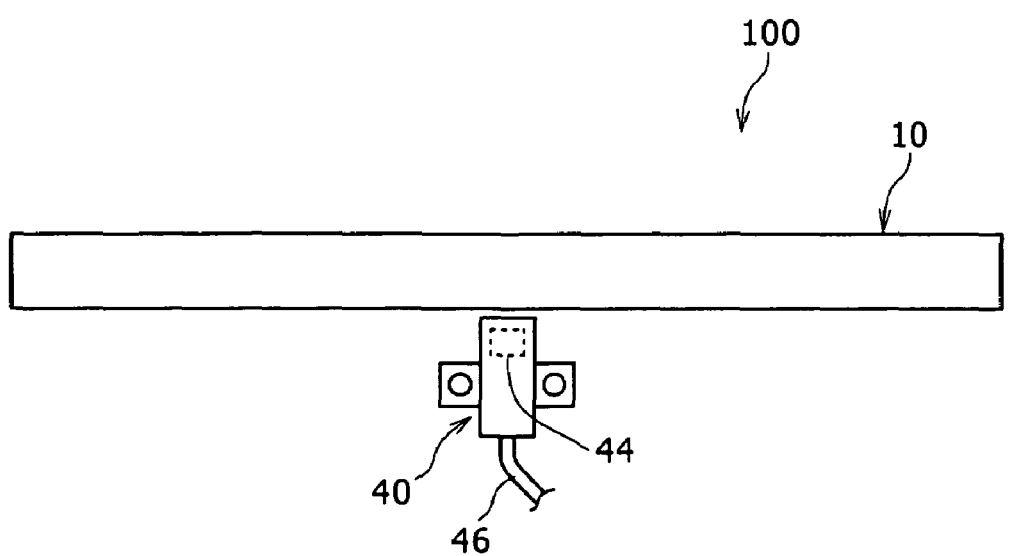
FIG. 2B is a schematic view of a detecting head separate type position detecting device using the magnetic scale shown in FIGS. 1A and 1B.

The application of the magnetic scale 10 according to the present invention is not limited to the position detecting device 100 of such a head combined type that the detecting head 40 is combined with the pipe 20 as shown in FIG. 2A. For example, the magnetic scale 10 can be applied also to a separate type position detecting device 100 as shown in FIG. 2B such that the detecting head 40 is not slidably supported to the pipe 20, but separated from the pipe 20.

Second Preferred Embodiment

A second preferred embodiment of the present invention will now be described.

Figure 3A:
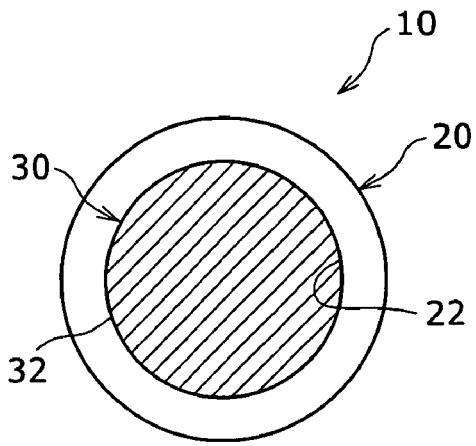
FIG. 3A is a sectional view of a magnetic scale according to a second preferred embodiment of the present invention.

FIG. 3A is a sectional view of a magnetic scale 10 according to the second preferred embodiment. Like or corresponding parts in the following description are denoted by the same reference numerals as those shown in FIG. 1A.

The second preferred embodiment is different from the first preferred embodiment in shape of the magnetic member 30.

As shown in FIG. 3A, the magnetic member 30 is a bar-shaped member having a cross section so as to fill the whole of the inside space of the pipe 20.

More specifically, the magnetic member 30 is a bar-shaped solid cylindrical member having a circular cross section so as to fill the whole of the circular cylindrical inside space defined by the inner surface 22 of the pipe 20. The outer diameter of the magnetic member 30 is slightly smaller than the inner diameter of the pipe 20.

The outer surface 32 of the magnetic member 30 is closely attached to the inner surface 22 of the pipe 20, and the magnetic member 30 extends straight in the longitudinal direction of the pipe 20.

As in the first preferred embodiment, the magnetic member 30 is a polarizable member, and it is formed with magnetic marks provided by a plurality of N poles and S poles alternately arranged with a given pitch in the longitudinal direction of the magnetic member 30. Further, the magnetic member 30 is formed of an elastic material such as rubber magnet.

The polarization of the magnetic member 30, that is, the formation of the magnetic marks is effected by using a polarizing device similar to that mentioned in the first preferred embodiment.

The attachment of the magnetic member 30 to the inner surface 22 of the pipe 20 is effected by using an adhesive to bond the outer surface 32 of the magnetic member 30 and the inner surface 22 of the pipe 20.

According to the second preferred embodiment, effects similar to those of the first preferred embodiment can be exhibited. Further, as compared with the first preferred embodiment, the volume of the magnetic member 30 per unit length of the magnetic scale 10 can be increased. Accordingly, by increasing the magnetic field strength of the magnetic member 30, a surface magnetic flux density on the outer surface of the pipe 20 can be increased, so that the voltage level of a detection signal output from the magnetic sensor 44 of the detecting head 40 can be ensured.

Furthermore, according to the second preferred embodiment, the magnetic field of the magnetic member 30 is generated uniformly over the whole region about the axis of the pipe 20. Accordingly, the detection signal can be obtained regardless of the location of the magnetic sensor 44 of the detecting head 40 about the axis of the pipe 20, so that the flexibility of arrangement of the magnetic scale 10 and the detecting head 40 can be ensured.

Third Preferred Embodiment

A third preferred embodiment of the present invention will now be described.

Figure 3B:
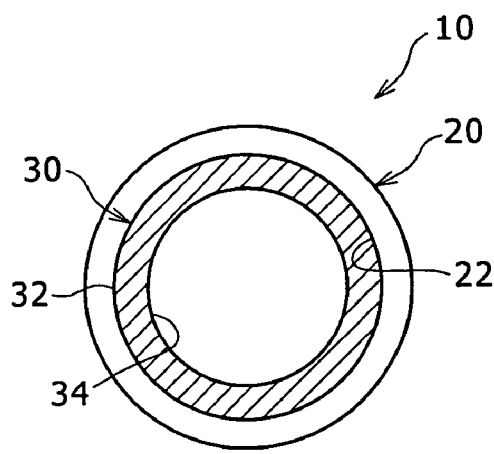
FIG. 3B is a sectional view of a magnetic scale according to a third preferred embodiment of the present invention.

FIG. 3B is a sectional view of a magnetic scale 10 according to the third preferred embodiment.

The third preferred embodiment is different from the first preferred embodiment in shape of the magnetic member 30.

As shown in FIG. 3B, the magnetic member 30 is a hollow cylindrical member closely fitted to the whole of the inner surface 22 of the pipe 20.

More specifically, the magnetic member 30 is a tubular member having an annular cross section whose outer diameter is slightly smaller than the inner diameter of the pipe 20. The outer surface 32 of the magnetic member 30 is closely attached to the inner surface 22 of the pipe 20, and the magnetic member 30 extends straight in the longitudinal direction of the pipe 20.

As in the first preferred embodiment, the magnetic member 30 is a polarizable member, and it is formed with magnetic marks provided by a plurality of N poles and S poles alternately arranged with a given pitch in the longitudinal direction of the magnetic member 30. Further, the magnetic member 30 is formed of an elastic material such as rubber magnet.

The polarization of the magnetic member 30, that is, the formation of the magnetic marks is effected by using a polarizing device similar to that mentioned in the first preferred embodiment.

The attachment of the magnetic member 30 to the inner surface 22 of the pipe 20 is effected by using an adhesive to bond the outer surface 32 of the magnetic member 30 and the inner surface 22 of the pipe 20.

According to the third preferred embodiment, effects similar to those of the first preferred embodiment can be exhibited. Further, as in the second preferred embodiment, the magnetic field of the magnetic member 30 is generated uniformly over the whole region about the axis of the pipe 20. Accordingly, the detection signal can be obtained regardless of the location of the magnetic sensor 44 of the detecting head 40 about the axis of the pipe 20, so that the flexibility of arrangement of the magnetic scale 10 and the detecting head 40 can be ensured.

Fourth Preferred Embodiment

A fourth preferred embodiment of the present invention will now be described.

Figure 3C:
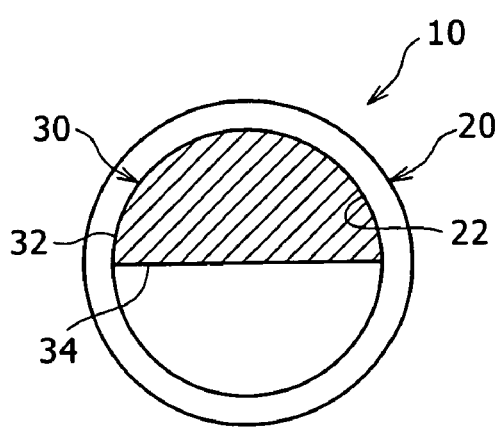
FIG. 3C is a sectional view of a magnetic scale according to a fourth preferred embodiment of the present invention.

FIG. 3C is a sectional view of a magnetic scale 10 according to the fourth preferred embodiment.

The fourth preferred embodiment is different from the first preferred embodiment in shape of the magnetic member 30.

As shown in FIG. 3C, the magnetic member 30 is closely attached to a circumferential part of the inner surface 22 of the pipe 20 and extends straight in the longitudinal direction of the pipe 20.

More specifically, the magnetic member 30 is a semicylindrical member having a semicircular cross section so as to fill the half of the circular cylindrical inside space of the pipe 20. Accordingly, the outer surface 32 of the magnetic member 30 is formed as a semicylindrical surface closely attached to the inner surface 22 of the pipe 20, and the magnetic member 30 extends straight in the longitudinal direction of the pipe 20.

As in the first preferred embodiment, the magnetic member 30 is a polarizable member, and it is formed with magnetic marks provided by a plurality of N poles and S poles alternately arranged with a given pitch in the longitudinal direction of the magnetic member 30. Further, the magnetic member 30 is formed of an elastic material such as rubber magnet.

The polarization of the magnetic member 30, that is, the formation of the magnetic marks is effected by using a polarizing device similar to that mentioned in the first preferred embodiment.

The attachment of the magnetic member 30 to the inner surface 22 of the pipe 20 is effected by using an adhesive to bond the outer surface 32 of the magnetic member 30 and the inner surface 22 of the pipe 20.

According to the fourth preferred embodiment, effects similar to those of the first preferred embodiment can be exhibited. Further, as in the second preferred embodiment, the volume of the magnetic member 30 per unit length of the magnetic scale 10 can be increased as compared with the first preferred embodiment. Accordingly, by increasing the magnetic field strength of the magnetic member 30, a surface magnetic flux density on the outer surface of the pipe 20 can be increased, so that the voltage level of a detection signal output from the magnetic sensor 44 of the detecting head 40 can be ensured.

Fifth Preferred Embodiment

A fifth preferred embodiment of the present invention will now be described.

Figure 3D:
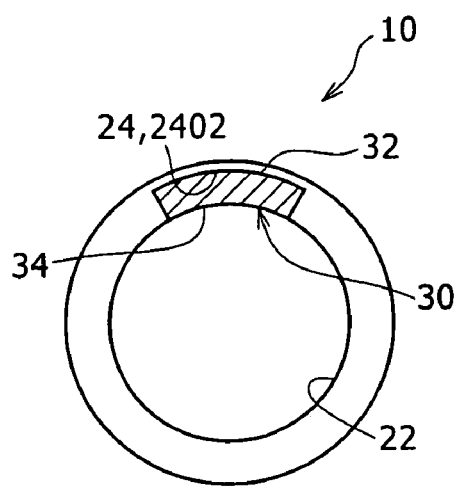
FIG. 3D is a sectional view of a magnetic scale according to a fifth preferred embodiment of the present invention.

FIG. 3D is a sectional view of a magnetic scale 10 according to the fifth preferred embodiment.

The fifth preferred embodiment is different from the first preferred embodiment in mounting structure of the magnetic member 30.

As shown in FIG. 3D, a groove 24 is formed on a circumferential part of the inner surface 22 of the pipe 20 so as to extend straight in the longitudinal direction of the pipe 20.

The magnetic member 30 is just fitted with the groove 24. The outer surface 32 of the magnetic member 30 is closely attached to the bottom surface 2402 of the groove 24 of the pipe 20, and the magnetic member 30 extends straight in the longitudinal direction of the pipe 20.

As in the first preferred embodiment, the magnetic member 30 is a polarizable member, and it is formed with magnetic marks provided by a plurality of N poles and S poles alternately arranged with a given pitch in the longitudinal direction of the magnetic member 30. Further, the magnetic member 30 is formed of an elastic material such as rubber magnet.

The polarization of the magnetic member 30, that is, the formation of the magnetic marks is effected by using a polarizing device similar to that mentioned in the first preferred embodiment.

The attachment of the magnetic member 30 to the bottom surface 2402 of the groove 24 of the pipe 20 is effected by using an adhesive to bond the outer surface 32 of the magnetic member 30 and the bottom surface 2402 of the groove 24.

According to the fifth preferred embodiment, effects similar to those of the first preferred embodiment can be exhibited. Further, since the magnetic member 30 is fitted with the groove 24 formed on the inner surface 22 of the pipe 20, the distance between the outer surface 32 of the magnetic member 30 and the outer surface of the pipe 20 can be reduced. Accordingly, a surface magnetic flux density on the outer surface of the pipe 20 can be increased, so that the voltage level of a detection signal output from the magnetic sensor 44 of the detecting head 40 can be ensured.

Particularly, even in the case that the wall thickness of the pipe 20 is increased to ensure the strength of the pipe 20, the voltage level of a detection signal output from the magnetic sensor 44 of the detecting head 40 can be ensured.

Sixth Preferred Embodiment

A sixth preferred embodiment of the present invention will now be described.

Figure 3E:
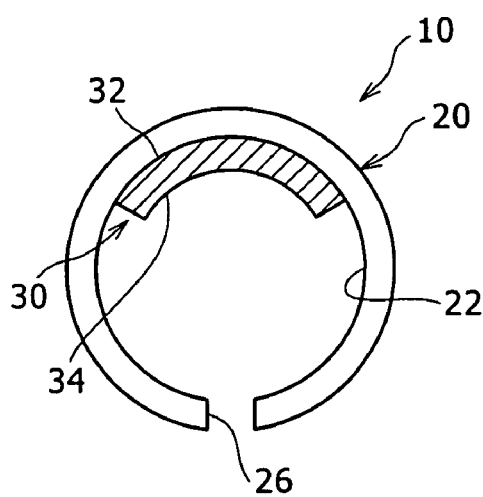
FIG. 3E is a sectional view of a magnetic scale according to a sixth preferred embodiment of the present invention.

FIG. 3E is a sectional view of a magnetic scale 10 according to the sixth preferred embodiment.

The sixth preferred embodiment is different from the first preferred embodiment in shape of the pipe 20.

As shown in FIG. 3E, a slit 26 is formed through the wall of the pipe 20 at a circumferential part thereof so as to extend straight in the longitudinal direction of the pipe 20.

In other words, the inside space of the pipe 20 communicates with the outside thereof through the slit 26.

Also in the case that the slit 26 is formed through the wall of the pipe 20 in this manner, effects similar to those of the first preferred embodiment can be exhibited.

Seventh Preferred Embodiment

A seventh preferred embodiment of the present invention will now be described.

Figure 4A:
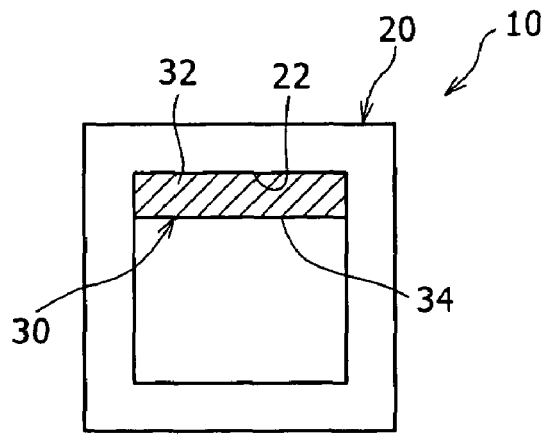
FIG. 4A is a sectional view of a magnetic scale according to a seventh preferred embodiment of the present invention.

FIG. 4A is a sectional view of a magnetic scale 10 according to the seventh preferred embodiment.

The seventh preferred embodiment is different from the first preferred embodiment in the point that the pipe 20 is a rectangular cylindrical member and that the magnetic member 30 is closely attached to one of the four sides forming the inner surface 22 of the pipe 20. The other configuration is similar to that of the first preferred embodiment.

According to the seventh preferred embodiment, effects similar to those of the first preferred embodiment can be exhibited.

Eighth Preferred Embodiment

An eighth preferred embodiment of the present invention will now be described.

Figure 4B:
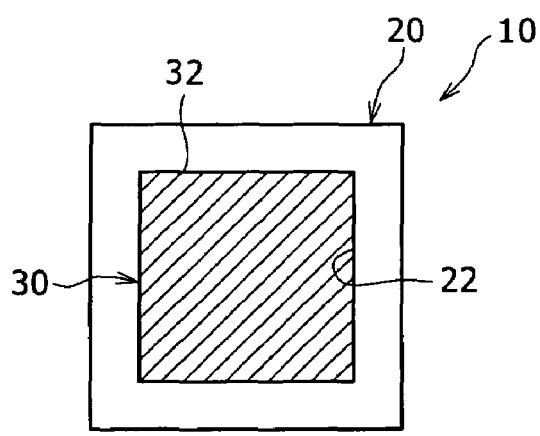
FIG. 4B is a sectional view of a magnetic scale according to an eighth preferred embodiment of the present invention.

FIG. 4B is a sectional view of a magnetic scale 10 according to the eighth preferred embodiment.

The eighth preferred embodiment is different from the second preferred embodiment in the point that the pipe 20 is a rectangular cylindrical member and that the magnetic member 30 is a solid rectangular cylindrical member filling the whole of the inside space of the pipe 20. The other configuration is similar to that of the second preferred embodiment.

According to the eighth preferred embodiment, effects similar to those of the second preferred embodiment can be exhibited.

Ninth Preferred Embodiment

A ninth preferred embodiment of the present invention will now be described.

Figure 4C:
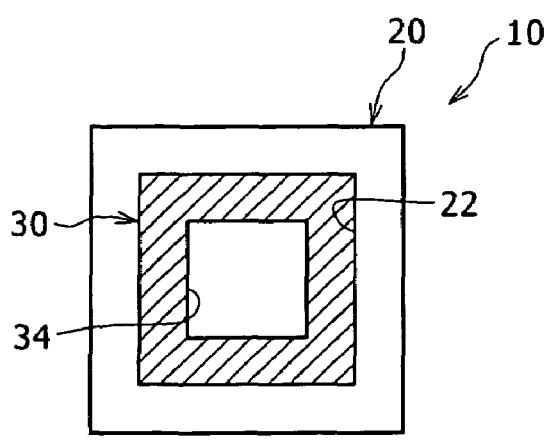
FIG. 4C is a sectional view of a magnetic scale according to a ninth preferred embodiment of the present invention.

FIG. 4C is a sectional view of a magnetic scale 10 according to the ninth preferred embodiment.

The ninth preferred embodiment is different from the third preferred embodiment in the point that the pipe 20 is a rectangular cylindrical member and that the magnetic member 30 is a hollow rectangular member closely attached to the whole of the inner surface 22 of the pipe 20. The other configuration is similar to that of the third preferred embodiment.

According to the ninth preferred embodiment, effects similar to those of the third preferred embodiment can be exhibited.

Tenth Preferred Embodiment

A tenth preferred embodiment of the present invention will now be described.

Figure 4D:
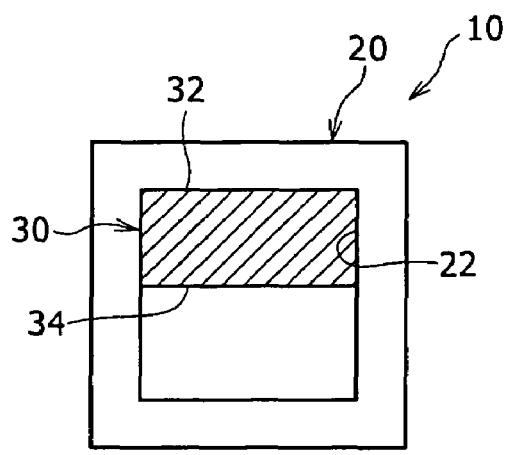
FIG. 4D is a sectional view of a magnetic scale according to a tenth preferred embodiment of the present invention.

FIG. 4D is a sectional view of a magnetic scale 10 according to the tenth preferred embodiment.

The tenth preferred embodiment is different from the fourth preferred embodiment in the point that the pipe 20 is a rectangular cylindrical member and that the magnetic member 30 is a solid rectangular cylindrical member filling substantially the half of the inside space of the pipe 20. The other configuration is similar to that of the fourth preferred embodiment.

According to the tenth preferred embodiment, effects similar to those of the fourth preferred embodiment can be exhibited.

Eleventh Preferred Embodiment

An eleventh preferred embodiment of the present invention will now be described.

Figure 4E:
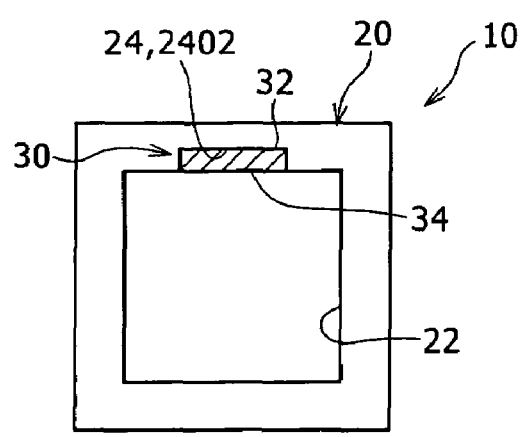
FIG. 4E is a sectional view of a magnetic scale according to an eleventh preferred embodiment of the present invention.

FIG. 4E is a sectional view of a magnetic scale 10 according to the eleventh preferred embodiment.

The eleventh preferred embodiment is different from the fifth preferred embodiment in the point that the pipe 20 is a rectangular cylindrical member and that the groove 24 is formed on one of the four sides forming the inner surface 22 of the pipe 20 so as to extend in the longitudinal direction of the pipe 20 and that the magnetic member 30 is fitted with the groove 24 so as to be closely attached to the bottom surface 2402 of the groove 24. The other configuration is similar to that of the fifth preferred embodiment.

According to the eleventh preferred embodiment, effects similar to those of the fifth preferred embodiment can be exhibited.

While the magnetic member 30 is formed of an elastic material such as rubber magnet in each preferred embodiment, the material of the magnetic member 30 is not limited to such a material, but any other polarizable materials such as plastic magnet, magnetic material coated member, and ferrite magnetic material may be used for the magnetic member 30.

Further, while the attachment of the magnetic member 30 to the pipe 20 is effected by using a double-sided adhesive tape or an adhesive in each preferred embodiment, the magnetic member 30 may be installed inside of the pipe 20 by pouring a powdered magnetic material into the inside space of the pipe 20 to form the magnetic material into a desired shape.

Further, while the cross section of the pipe 20 is circular or rectangular in each preferred embodiment, the cross section of the pipe 20 may be of any other shapes including an elliptical shape and a polygonal shape.

While the invention has been described with reference to specific embodiments, the description is illustrative and is not to be construed as limiting the scope of the invention.

Various modifications and changes may occur to those skilled in the art without departing from the spirit and scope of the invention as defined by the appended claims.

The invention claimed is:

1. A magnetic scale, comprising:
   a pipe; and
   a polarizable magnetic member closely attached to the inner surface of the pipe so as to extend in the longitudinal direction of the pipe;
   the pipe being formed of a material having no magnetic effect on the magnetic force of the magnetic member, and
   the magnetic member being formed with magnetic marks provided by a plurality of N poles and S poles alternately arranged in the longitudinal direction of the magnetic member.

2. The magnetic scale according to claim 1, wherein said pipe is formed of a nonmagnetic material.

3. The magnetic scale according to claim 1, wherein the magnetic member is bonded through a double-sided adhesive tape to the inner surface of the pipe.

4. The magnetic scale according to claim 1, wherein the magnetic member comprises a strip member closely attached to a circumferential part of the inner surface of the pipe so as to extend in the longitudinal direction of the pipe.

5. The magnetic scale according to claim 1, wherein the magnetic member comprises a bar-shaped member having a cross section so as to fill the whole of the inside space of the pipe.

6. The magnetic scale according to claim 1, wherein the pipe comprises a cylindrical member, and the magnetic member comprises a cylindrical member closely attached to the whole of the inner surface of the pipe.

7. The magnetic scale according to claim 1, wherein the pipe comprises a cylindrical member, and a groove is formed on a circumferential part of the inner surface of the pipe so as to extend in the longitudinal direction of the pipe, the magnetic member including a strip member fitted in the groove.

8. The magnetic scale according to claim 1, wherein the pipe comprises a cylindrical member, and the magnetic member includes a cylindrical member having a cross-sectional size adapted to fill half of the inside space of the pipe.

9. The magnetic scale according to claim 1, wherein the magnetic member is formed of an elastic material.

* * * * *